United States Patent [19]

Suzuki et al.

[11] 4,309,482
[45] Jan. 5, 1982

[54] MAGNETIC RECORDING MEDIUM

[75] Inventors: Takashi Suzuki, Takatsuki; Isao Sumita, Toyonaka; Akihiro Imai, Kyoto, all of Japan

[73] Assignee: Matsushita Electric Industrial Co., Ltd., Osaka, Japan

[21] Appl. No.: 58,917

[22] Filed: Jul. 19, 1979

[51] Int. Cl.³ ............................................. B32B 27/38
[52] U.S. Cl. .................................. 428/413; 427/54.1; 428/447; 428/695; 428/900
[58] Field of Search ................... 427/131, 132, 54.1; 428/695, 900, 447, 413

[56] References Cited

U.S. PATENT DOCUMENTS

| | | | |
|---|---|---|---|
| 3,595,630 | 7/1971 | Wilhelm et al. | 427/132 X |
| 3,772,062 | 11/1973 | Shur et al. | 427/54 X |
| 3,993,824 | 11/1976 | Shirahata et al. | 427/131 X |
| 4,072,592 | 2/1978 | Due et al. | 427/54 |
| 4,075,384 | 2/1978 | Suzuki et al. | 427/131 X |
| 4,091,158 | 5/1978 | Kasuga et al. | 427/131 X |
| 4,156,035 | 5/1979 | Tsao et al. | 427/54 X |
| 4,171,388 | 10/1979 | Allen et al. | 427/132 X |

*Primary Examiner*—Bernard D. Pianalto
*Attorney, Agent, or Firm*—Burgess, Ryan and Wayne

[57] ABSTRACT

A thin film type magnetic recording medium having a coating of ultraviolet ray setting epoxy resin containing a lubricant at least on one major surface. Degradation of resistance to wear may be minimized and stable recording and reproduction characteristics may be ensured even at high temperatures and at high humidity.

4 Claims, No Drawings

MAGNETIC RECORDING MEDIUM

BACKGROUND OF THE INVENTION

The present invention relates to magnetic recording media having high resistance to wear.

Thin film type magnetic recording media are fabricated by coating a thin ferromagnetic film on a base such as plastic film by the techniques of vacuum deposition, sputtering, ion plating and so on. Thin film type magnetic recording media or tapes are advantageous over the prior art coated type magnetic recording media in that the thickness of magnetic thin film may be reduced by a factor of one so that they are adapted especially for use in high density recording such as recording of video signal. However, ferromagnetic thin films are so hard that the wear and abrasion of a magnetic head results and the films themselves are also worn and abraided. In order to overcome this problem, a protective film must be formed on a ferromagnetic thin film. For instance, a monomolecular film of lubricant such as stearic acid is formed or a film of thermoplastic resins such as nylon including a lubricant is formed. These prior art protective films exhibit sufficient resistance to wear at relatively low temperatures and humidity as to 20° C. and 50%, but the resistance to wear is considerably degraded at relatively high temperatures and humidity such as 30°-50° C. and at 80-90% so that the protective films are useless in practice. Environmental conditions under which home equipment such as home video tape recorders, audio recorders and so on are used are not specifically determined. That is, the equipment is often used at relatively high temperatures and at high humidity. It follows therefore that ferromagnetic thin films must be coated with a protective film which may effectively prevent rapid wear and abrasion of both a magnetic head and a magnetic recording medium.

When a ferromagnetic thin film is applied on a base, the latter is generally heated in vacuum so that various additives present at the vicinity of the surfaces of the base and evaporated and removed. As a result, the uncoated surface of the base lacks smoothness and exhibits increased insulation resistance so that triboelectric charging tends to occur very frequently. In addition, the magnetic thin film becomes electrically conductive so that the transport of magnetic recording medium is sometimes hindered by electrostatic interference. These are the main reasons why the uncoated surfaces of magnetic recording media must be treated.

SUMMARY OF THE INVENTION

Accordingly, one of the objects of the present invention is to provide a magnetic recording medium which may exhibit high resistance to wear and may maintain satisfactory recording and reproduction characteristics even at high temperatures and at high humidity.

Another object of the present invention is to provide a magnetic recording medium whose at least one major surface is coated with a thin film of ultraviolet ray setting epoxy resins containing a lubricant.

DESCRIPTION OF THE PREFERRED EMBODIMENTS

The present invention relates to a magnetic recording medium characterized in that it has a ferromagnetic thin film as a magnetic recording layer and at least one of its major surfaces is coated with a thin film of ultraviolet ray setting epoxy resins containing a lubricant. Ultraviolet ray setting epoxy resins are such that when they are irradiated with ultraviolet rays, ion polymerization is initiated and the resins are set. A typical example comprises unreacted epoxy resins, aromatic diazonium salts of complexes of halides which form a Lewis acid when irradiated by ultraviolet rays and a gelation inhibitor which serves to neutralize the Lewis acid formed by the thermal decomposition prior to the irradiation with ultraviolet rays. The epoxy resins of the type described above are explained in detail in Japanese Laid Open Pat. No. 49-121884.

Unreacted epoxy resins are bisphenol type epoxies such as a diglycidyl ether of bisphenol A, a polyglycidyl ether of bisphenol A; cyclic aliphatic type epoxides such as 1,2-epoxycyclohexane, vinylcyclohexenedioxide, 3,4-epoxycyclohexyl-methyl, 3'4'-epoxycyclohexenecarboxylate, 3,4-epoxy-6-methylcyclohexyl methyl, 3'4'-epoxy-6'-methylcyclohexenecarboxylate and so on; glycidylalkyl ether type epoxides such as glycidylphenylether and hexanedioldizlycidylether; and novolac type epoxides. The above epoxy resins may be all used in the present invention, but most desirable effects are obtained when the epoxy resin compound contains cyclic aliphatic type epoxides in a quantity of more than one half based upon the total weight.

Aromatic diazonium salts of complexes of halides which form a Lewis acid when irradiated by ultraviolet rays are p-nitrobenzenediazoniumhexafluorophosphate, 2,5-dichlorobenzenediazoniumhexafluorophosphate, 2,4-dichlorobenzene diazoniumtetrafluoroborate, 4-)diamethylamino)-1-naphthalene diazoniumhexafluorophosphate and so on.

Gelation inhibitors are cyclic amids such as 1-methyl-4-pyrrolidine, 1,-5-dimethyl-2-pyrrolidine and so on.

The protective film made from a compound consisting of 100 parts in weight of unreacted epoxy resins of the type described above, 0.5 to 5 parts by weight of aromatic diazonium salts and 0.02 to 1.5 parts by weight of a gelation inhibitor were found to be unsatisfactory in smoothness so that the present invention further adds special lubricants as described in detail below.

Some of the lubricants used in plastic fabrication and of additives such as extreme-pressure agents added to lubricants have been found to provide very satisfactory results when used in the present invention. The first type comprises aliphatic esters of polyhydric alcohols such as ethylene glycol, glycerin, pentaerythritol, sorbitol and so on. For instance, they are available in the market as "POEM S-100" (aliphatic monoglyceride), "S-120" (polyoxyethylene glycerin monostearate) and "S-250" (sorbitan stearate), all the products of RIKEN VITAMIN KK.

A second type of lubricant includes denatured silicones obtained by the chemical reactions between alkylpolysiloxane on the one hand and polyhydric aliphatic hydrocarbons, polyhydric aliphatic acids, polyhydric alcohols, alkyleneglycol, fluoroalkyl and so on the other hand. They are available in the market under the trademarks of "PAINTATIVE DC-11 and FS-1265", the products of DOW CORNING CORP; under the tradename of "SF-69 OIL", the product of GE Corp; under the trademark of "KP-301" the product of SHINETSU KAGAKU KK; under the trademarks of "L-77", "L-7607" and "L-49", the products of NIPPON UNIKA KK. The third type includes denatured fluorine oils obtained by the chemical reactions between perfluoroalkyl on the one hand and polyhydric aliphatic acids, polyhydric alcohols, alkyleneglycol and so on, on the other hand. They are also available in the market under the trademarks of "FC-430", add "FC-431", the products of SUMITO 3M, KK; under the trademarks of "MEGAFAC F-120, F142D, F-171, F-177", the products of DAINIPPON INK KK.

One or more types of lubricants described above may be directly mixed with epoxy compounds. Alternatively, one or more types of lubricants may be dissolved in suitable solvents and added to epoxy compounds. It is preferable to add 0.01 to 20 parts by weight of one or more types of lubricants to 100 parts by weight of an epoxy resin compound.

In addition to the above described lubricants, solid powder lubricants such as graphite, molybdenum disulfide, carbon fluoride, tetrafluoroethylene and so on; and a finely divided powder such as carbon powder, various organic pigments aluminum powder and so on may be used. Furthermore, suitable solvents may be added to epoxy resin compounds in order to reduce their viscosity. Furthermore, polymerization control agents, antistatic agents, stabilizers, anticorrosion agents and so on may be added. When the solvents are evaporated prior to the irradiation of ultraviolet rays, there will be no adverse effects on hardening or setting.

A protective film of ultraviolet ray setting epoxy resins in accordance with the present invention may be directly formed on a ferromagnetic thin film of Co-P, Co, Co-Fe, Co-Ni, Fe-Ni coated on a base by conventional techniques. Alternatively, an anticorrosion film of Al, Cr and so on may be interposed between a protective film and a ferromagnetic thin film. In view of spacing loss of a magnetic head, it is preferable to control the thickness, after hardening, of the protective film to less than 0.5 micrometers or more preferably, between 0.01 and 0.1 micrometers. Satisfactory results may be also achieved when a protective thin film is applied on the uncoated or rear surface of a base to a thickness of between 0.01 and 0.1 micrometers. In this case, it is not needed to take the spacing loss into consideration so that a protective thin film may be from 0.5 to a few micrometers in thickness. Even though the epoxy resin protective thin films of the present invention are less than 0.1 micrometers in thickness, they exhibit excellent bonding strength and resistance to wear especially at high temperatures and high humidity such as at 30° to 50° C. and at 80 to 90%.

It is most preferable to coat both the surfaces of a magnetic recording medium with protective thin films of the present invention, but it is to be understood that even when only one protective thin film is applied on one surface of a magnetic recording medium, very satisfactory results may be obtained because the lubricants in the protective thin film are transferred or transplanted onto the other surface when the magnetic recording medium or tape is wound.

Next some examples of the present invention will be described.

EXAMPLE 1

A cobalt ferromagnetic thin film was coated to a thickness of 0.3 micrometers by vacuum deposition techniques on a base of biaxially extended polyester film. Thereafter, the compound of the composition described below was applied by a photogravure coater on the ferromagnetic thin film to a thickness of about four micrometers and the solvent was evaporated at 80° C. Next, the protective layer or thin film was irradiated for two seconds by the ultraviolet rays emitted from a straight ultraviolet ray lamp with a rated lamp power of 80 W/cm so that the protective layer or thin film was hardened. Thereafter, the magnetic recording medium was cut into a tape with a suitable width, which will be referred to as "specimen A".

| Composition | Parts by weight |
| --- | --- |
| vinylcyclohexenedioxide | 100 |
| p-nitrobenzene diazoniumhexafluorophosphate | 1 |
| pentaerythritol tetrastearate | 1 |
| acetone | 2000 |
| toluene | 2000 |

EXAMPLE 2

Following the procedure of Example 1, specimen B was prepared, but instead of the lubricant, pentaerythritol tetrastearate, denatured silicon available in the market under the trademark of "KP-301", the product of SHINETSU KAGAKU KK, was used, the quantity being 1 part by weight.

EXAMPLE 3

Following also the procedure of Example 1, specimen C was prepared, but as the lubricant, one part of "MEGAFAC F120", the product of DAINIPPON INK KK, was used.

EXAMPLE 4

Following the procedure of Example 3, specimen D was prepared, but the protective thin film was made on the rear surface of the base.

For the sake of comparison, two specimens E and F were also prepared. Specimen E was prepared by following the procedure of Example 1, but the lubricant, pentaerythritol tetrastearate was excluded.

Specimen F was prepared from a compound having the following composition.

| | Parts by weight |
| --- | --- |
| polyamide resin (THOMIDE #395) | 100 |
| pentaerythrital tetrastearete | 3 |
| xylene | 3000 |
| isopropylalcohol | 3000 |

Instead of initiating the setting of the protective thin film with the irradiation of ultraviolet rays, the protective thin film was subjected to heat treatment with hot air of 120° C.

These specimens A-F were subjected to still tests with a home video tape recorder placed in a thermohydrostat. The test results are shown below.

| Environmental conditions | | Still time in minutes | | | | | |
| --- | --- | --- | --- | --- | --- | --- | --- |
| temperature in °C. | humidity in % | A | B | C | D | E | F |
| 20° C. | 50% | 60 | 45 | 55 | 35 | 10 | 60 |
| 20° C. | 90% | 50 | 30 | 45 | 40 | 10 | 25 |
| 30° C. | 40% | 60 | 30 | 55 | 30 | 10 | 30 |
| 30° C. | 90% | 45 | 25 | 40 | 25 | 5 | 5 |
| 40° C. | 90% | 40 | 25 | 35 | 25 | 5 | 1 |

EXAMPLE 5

A Co ferromagnetic thin film was coated to a thickness of 0.3 micrometers by the techniques of vacuum deposition on a base of tensilized polyester film 6 micrometers in thickness. A protective thin film compound having the following composition was applied by a photogravure coater to a thickness of about four micrometers on both sides over the ferromagnetic thin film.

| Composition | Parts by weight |
| --- | --- |
| 3,4-epoxycyclohexylmethyl, 3'4'-epoxycyclohexenecarboxylate | 50 |
| hexanedioldiglycidylether | 50 |
| "L-77", the product of NIPPON UNIKA KK. | 1 |
| p-nitrobenzenediazoniumtetrafluoroborate | 5 |
| ethyl acetate | 4000 |
| benzene | 2000 |

The solvents were evaporated at 80° C. and thereafter the protective thin film was hardened by irradiating for three seconds with the ultraviolet rays emitted from a straight ultraviolet ray lamp with rated power of 80 W/cm. The magnetic recording medium thus prepared was cut into tape with a suitable width, which is referred to as "specimen G".

EXAMPLE 6

Following the procedure of Example 5, specimen H was prepared, but the composition was changed as follows:

| | |
| --- | --- |
| 3,4-epoxycyclohexylmethyl, 3',4'-epoxycyclohexenecarboxylate | 40 parts by weight |
| hexanedioedigylcidylether | 60 parts by weight |

The other ingredients remained unchanged.

For the sake of comparison, specimen I was prepared by following the procedure of Example 5, but the composition of the protective thin film was changed as follows:

| Composition | Parts by weight |
| --- | --- |
| vinylidenechloride acryl series copolymers "ALON CH-2", the product of TOA GOSEI KAGAKU KK. | 100 |
| "L-77", the product of NIPPON UNIKA KK. | 1 |

-continued

| Composition | Parts by weight |
| --- | --- |
| Ethyl acetate | 2000 |
| Methylethylketone | 1000 |
| Toluene | 1000 |

Furthermore, instead of irradiating with the ultraviolet rays, the protective thin film was subjected to a drying step with hot air at 120° C.

The specimens G, H and I were loaded into respective cassettes and tested with a micro-cassette tape recorder commercially available in the market. That is, recording and reproduction were repeatedly made at 40° C. and at 70% humidity. After 20 repeated recordings and reproductions, specimen G showed no noticeable change in characteristics. As for specimen H, after the 15-th run, the reproduction output dropped slightly because of the contamination of the reproducing head, but stable transport was ensured up to the 20-th run. As for specimen I, the reproduction head was contaminated even after the first run so that the reproduction output dropped remarkably. Furthermore, the transport of the tape was not stable.

In summary, the magnetic recording media in accordance with the present invention may exhibit almost unchanged resistance to wear and may maintain satisfactory recording and reproduction characteristics even at high temperatures and at high humidity. Thus, they are extremely important commercially.

What is claimed is:

1. A magnetic recording medium comprising a thin ferromagnetic film on a base and at least one surface of said magnetic recording medium being coated with a thin film of an ultraviolet ray hardened coating, said coating before ultraviolet ray hardening consisting essentially of unreacted epoxy resin, aromatic diazonium salts of complexes of halides which form a Lewis acid when irradiated by ultraviolet rays, a gelation inhibitor and lubricant.

2. A magnetic recording medium as set forth in claim 1 further characterized in that said lubricant is selected from the group consisting of aliphatic esters of polyhydric alcohols, denatured silicone and denatured fluoride oil.

3. A magnetic recording medium as set forth in claim 2 wherein the lubricant is pentaerythritol stearate or denatured silicone.

4. A magnetic recording medium as set forth in claim 1 further characterized in that said unreacted epoxy resins contain cyclic aliphatic type epoxy resins in a quantity more than one half by weight based on the total weight of said unreacted epoxy resins.

* * * * *